March 17, 1953  A. W. HUBBARD ET AL  2,631,953
BONDING ISOOLEFIN-DIOLEFIN RUBBER TO METAL BY
AN ISOOLEFIN-STYRENE-DIOLEFIN RESIN AND
A MODIFIED NATURAL RUBBER TIE PLY
Filed March 12, 1949
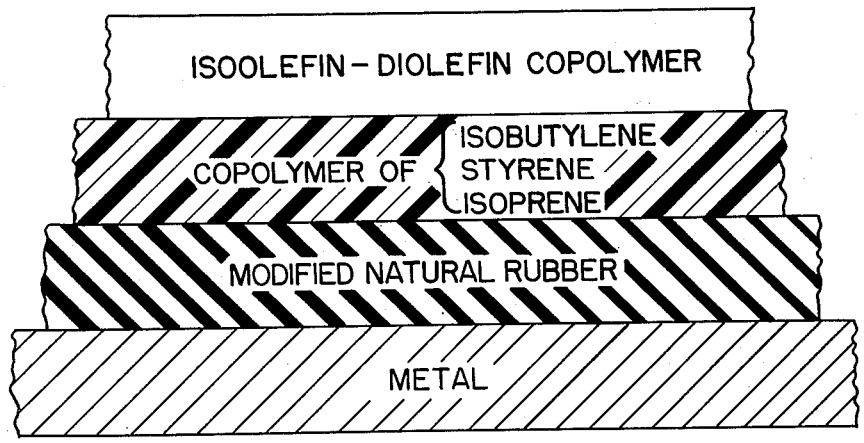
Addison W. Hubbard
Winthrope C. Smith   Inventors
By  H. H. Smyers  Attorney Patented Mar. 17, 1953

2,631,953

UNITED STATES PATENT OFFICE 2,631,953

BONDING ISOOLEFIN-DIOLEFIN RUBBER TO METAL BY AN ISOOLEFIN-STYRENE-DIOLEFIN RESIN AND A MODIFIED NATURAL RUBBER TIE PLY

Addison W. Hubbard, Elizabeth, and Winthrope C. Smith, Westfield, N. J., assignors to Standard Oil Development Company, a corporation of Delaware Application March 12, 1949, Serial No. 81,208

4 Claims. (Cl. 154—43)

1

This invention relates to an adhesive and more particularly relates to an adhesive adapted to unite relatively non-polar rubber-like materials to metals.

For many purposes it is extremely desirable that natural rubber and other relatively non-polar rubber-like materials should be made to adhere firmly to metal and other solid bodies for use as tank linings, solid tires, etc.

A particularly non-polar rubber-like material is the low unsaturation copolymer described in U. S. 2,356,128. This material is prepared by copolymerizing an isoolefin, such as isobutylene with a diolefin, such as butadiene or isoprene, by the use of temperature below about 0° C., preferably below —50° C. and even as low as —106° C., or lower, in the presence of a suitable catalyst, such as aluminum chloride dissolved in a lower alkyl halide such as methyl or ethyl chloride.

In the past, the most effective method for obtaining adhesion of the above-described copolymer to metals has been to incorporate high concentrations of carbon black in the cements and cover stocks. However, the results obtained by this method have not been promising.

It is, therefore, the main object of the present invention to provide a method for securing a tight bond between the above-described copolymers and other solid bodies, such as metals.

It is a further object of this invention to prepare a new type of adhesive for adhering low unsaturation copolymers of an isoolefin and a diolefin to metals.

It is a still further object of this invention to prepare an adhesive for adhering any relatively non-polar rubber-like material to metals.

According to the present invention, the above objects are accomplished by preparing a modified copolymer of an alkene, such as isobutylene with a polymerizable olefinic cyclic compound, such as styrene, dissolving this polymer in a suitable solvent, applying a proprietary natural or synthetic rubber cement to the metal surface as a prime cement, applying the solution of the modified copolymer to the prime cement, and curing the polymer cover stock, against the coated metal surface to adhere the polymer body to the metal.

The copolymers of an alkene with a polymerizable olefinic cyclic compound are described in U. S. Patent No. 2,274,749.

The modification of the above-described process, as carried out by the present invention, comprises the use of three instead of two monomeric polymerizable reactants, the third or new reactant being a small amount of a diolefin, such as isoprene. This tripolymer per se is claimed

2 in co-pending application 258,986, filed November 29, 1951.

Instead of isobutylene as the alkene, other aliphatic olefins may be used, preferably isoolefins having 4 to 8 carbon atoms, such as isopentene (methyl-2 butene-1), or a normal pentene obtained by dehydration of secondary amyl alcohol, although other lower olefins such as propylene may also be used.

Instead of styrene as the polymerizable olefinic cyclic compound, other materials may be used such as alpha-methyl styrene, para-methyl styrene, alpha-para-dimethyl styrene, indenes, terpenes, etc. Various derivatives or homologues of such compounds having one or more short alkyl groups (e. g. 1 to 10 carbon atoms) attached to the cyclic nucleus and not interfering with the polymerization, may be used.

Instead of isoprene as the modifying diolefin, one may also use butadiene; 2,3-dimethyl butadiene 1-3; 1,4-dimethyl butadiene 1,3; piperylene; cyclopentadiene; myrcene; 2-methyl 3-ethyl butadiene; hexatriene; 2-methyl-pentadiene; and allo-ocimene.

The proportions to be used in making up the polymerization feed stock may vary over a fairly wide range, depending partly on the ratio for instance of isobutylene to styrene, and upon the proportion of diolefins desired. Normally, however, the amount of isobutylene or other alkene should be within the general range of 20 to 90%, preferably about 30 to 70% by volume, while the styrene or other polymerizable olefinic cyclic compound should be about 2 to 80%, and preferably about 30 to 70% by volume, and finally the amount of diolefin should be about 1 to 30%, preferably about 2 to 10%.

The copolymerization is carried out at temperatures below 0° C., such as —10° C., —20° C., —50° C., —90° C., —103° C. (the boiling point of liquid ethylene) or even lower, and by the use of an active halide polymerization catalyst. Such catalyst may be aluminum chloride, boron fluoride, or activated boron fluoride containing 0.1% of ether, titanium tetrachloride, aluminum alkoxide-aluminum chloride complex $(AlCl_3 \cdot Al(OC_2H_5)_3)$, $AlBr_3$, $AlBr_3 \cdot Al(OC_2H_5)_3$ $(AlBr_3)_4 \cdot AlOBr$ and the like. If desired, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane or propane, at or below the boiling point of the catalyst solvent, and then the catalyst solution cooled down, filtered and added to the reaction mixture. Alternative catalysts include: $AlC_3 \cdot AlCl_2OH$, AlBr$_3$·AlBr$_2$OH, AlBr$_2$Cl·AlCl, AlBrCl$_2$·AlOBr, TiCl$_4$·AlCl$_2$OH, TiOCl$_2$·TiCl$_4$, AlBr$_3$·Br$_2$·CS$_2$, AlBr$_3$·Br$_4$·CS$_2$, BF$_3$-isopropyl alcohol complex, BF$_3$ solution in ethylene, activated BF$_3$ catalyst in ethylene solution.

The copolymerization is preferably carried out in the presence of a volatile solvent or diluent or refrigerant, such as propane, ethane, ethylene, methyl chloride, carbon dioxide (liquid or solid), etc.; such materials may be used either as internal refrigerants or external refrigerants or both, to remove the liberated heat of polymerization.

After completion of the copolymerization, residual catalyst may be hydrolyzed by adding an alcohol, for example, isopropyl alcohol or ethyl alcohol, or water or both, and removed by washing the product with water and preferably also with dilute aqueous caustic soda. Any residual solvents or wash water or other hydrolyzing agents may be removed by heating the copolymer with or without milling, kneading or other agitation.

The preferred procedure for carrying out the invention is to mix the isobutylene, styrene, and isoprene, or their equivalents, cool them down to the desired operating temperature by either external or internal refrigeration, preferably having some diluent or solvent present, and then adding to that polymerization feed the desired amount of catalyst or solution thereof, preferably agitating the mixture well during the addition of the catalyst.

After hydrolysis and removal of catalyst as previously mentioned, the high molecular weight polymer, which is the desired tripolymer, may be heated if desired, with or without milling or other agitation, to remove residual traces of solvent, diluent or refrigerant, or of water or alcohol left from the washing step. The tripolymer per se is a plastic generally having an average molecular weight ranging from about 2,000 to 100,000 or more, about 5,000 to 60,000 being most frequently obtained. When the copolymerization is carried out on an olefin feed which contains from 50 to 80% styrene at only moderately low temperatures such as $-23.7°$ C., the boiling point of methyl chloride, the tripolymer is of a resinous nature having a melting point in the general range of about 125 to 175° F., and ordinarily it is quite soluble in aromatic solvents such as benzene, toluene, and the like. In some cases, particularly with higher proportions of diolefins such 5 to 20% or so of isoprene, the polymer may not, after it has been removed from polymerization reactants, be completely soluble in benzene or toluene, but this solubility may be considerably increased by hot milling at about the melting point of the tripolymer; it is believed that this hot milling may effect some breakdown of the gel structure of three-dimensional polymer structure to some other tripolymer molecule. On the other hand, when the copolymerization is carried out at much lower temperatures such as $-103°$ C., the boiling point of ethylene, the tripolymer has a higher molecular weight and a tougher and more flexible texture and consistency, and can readily be sheeted out into thin, self-supporting films by rolling on the regular rubber mill or by calendering, with or without some modifying or plasticizing agent, such as paraffin wax, zinc stearate, etc.

One important characteristic of this new tripolymer is that it has a slight unsaturation, having an iodine number ranging from about 0.2 to 75, preferably about 0.5 to 20, so that when it has been used as a coating composition, the slight unsaturation permits the coating surface to harden further by oxidation. This slight unsaturation also gives this resinous plastic the ability to be vulcanized or cured by treatments somewhat similar to those used for vulcanizing a synthetic rubber made by low temperature copolymerization of isobutylene in the presence of a small amount of a polyolefin of 4 to 12 carbon atoms, such as 1 to 3% of isoprene, or somewhat larger amount, such as 5 to 10%, or so, of butadiene.

For curing the tripolymer, one may use sulfur and one of the various fast accelerators or ultra-accelerators, such as tetramethyl thiuram disulfide, mercapto benzothiazole, dinitrosobenzene, quinone dioxime with an oxidizing agent, such as lead peroxide or lead oxide or benzoyl peroxide, or esters and salts of quinone dioxime, as curing agents. The quantities may vary from 0.3 to 6 parts by weight of resin, the 6 parts being used in the case of the esters and 0.3 for quinone dioxime or para dinitrosobenzene. Temperatures of curing may be from room temperature to 400° F. Time of cure may vary from 10 seconds (at high temperature) to possibly several days or a week at room temperature.

The advantages in accordance with the present invention can be obtained only with certain proportions of the three monomers used in making the above-described modified copolymer. In accordance with the present invention, it has been found that a secure bond between the low unsaturation polymer through a proprietary rubber cement to the metal can be obtained only when the feed mixture supplied to the polymerization process comprises the monomers in the ratio 60 parts of the alkene, 40 parts of the cyclic compound, and 3 parts of the diolefin modifier. For example, a suitable mixture consists of 60 parts of isobutylene, 40 parts of styrene and 3 parts of isoprene.

The copolymer prepared in accordance with the above description is desirably used in the form of a cement prepared by dissolving the copolymer in a suitable solvent such as naphtha, benzene, toluene, xylene, cyclohexane, methyl cyclohexane, or mixtures of toluene with diisobutylene or the like. The metal surface to which the polymer is to be adhered is first coated with a proprietary rubber or rubber type cement, such as a solution of modified natural or synthetic rubber dissolved in naphtha, benzene or other usual solvent. The modified natural or synthetic rubber is a chlorinated rubber, cyclized rubber or rubber hydrochloride prepared in any desired manner known to the art. This solvent is allowed to evaporate and the solution of modified copolymer, as prepared above, is applied to the coated metal surface and the solvent allowed to evaporate. The coated metal surface and the surface of polymer cover stock are then brought together and the whole allowed to cure in situ to yield the desired adherent rubbery covering.

The accompanying drawing is a greatly magnified diagrammatic sectional view showing the present invention as applied to the bonding of an isoolefin-diolefin copolymer (synthetic rubber) to a base or body of metal, by means of intermediate layers of isobutylene-styrene-isoprene copolymer and modified natural rubber.

The effectiveness of the modified copolymer cement of the present invention in conjunction with a proprietary modified rubber type cement is well illustrated by the data given below:

TABLE I

| Formulae | Cover Stocks | | Copolymer |
|---|---|---|---|
| Butyl (Standard GR-I) [1] | 100.0 | | |
| Butyl (R-2 type) [2] | | 100.0 | |
| Zinc oxide | 5.0 | 5.0 | |
| Stearic acid | 3.0 | 3.0 | |
| Sulfur | 2.0 | 2.0 | |
| Tuads (tetramethyl thiuram disulfide) | 1.0 | 1.0 | |
| Semi-reinforcing black | 100.0 | 100.0 | |
| Medium processing channel black | 50.0 | 50.0 | 75.0 |
| Copolymer [3] | | | 100.0 |
| Solvent naphtha | | | 400.0 |

[1] 97% isobutylene, 3% isoprene.
[2] 98.55% isobutylene, 1.45% isoprene.
[3] Formed from 60 parts isobutylene, 40 parts styrene, 3 parts isoprene.

Construction #1:
  One coat natural rubber derivative cement on steel buttons. Two coats copolymer cement on top of the natural rubber cement. Cover stock cured under pressure in contact with coated buttons for 45′ @ 307° F.
    Limit of adhesion=800 lbs./sq. in.
    (Fails in Butyl cover stock.)
Construction #2:
  Identical with construction #1 except for the omission of the copolymer cement.
    Limit of adhesion=552 lbs./sq. in.
    (Fails at interface between the natural rubber cement and cover stock.)
Construction #3:
  Identical with construction #1 except for the substitution of R-2 Butyl cover stock for the standard GR-I stock.
    Limit of adhesion=610 lbs./sq. in.
    (Fails in R-2 cover stock.)
Construction #4:
  Identical with construction #2 except for the substitution of R-2 Butyl cover stock for the standard GR-I.
    Limit of adhesion=480 lbs./sq. in.
    (Fails between cover stock and the natural rubber cement.)

From the above data it is clearly evident that the use of the modified copolymer cement of the present invention greatly increases the bond between the Butyl rubber cover stock and metal as shown by the fact that when this cement is used in conjunction with a modified natural rubber cement, the limit of adhesion in pounds per square inch is greatly increased and that when failure occurs, it is the cover stock which gives way and not the bond.

The following table illustrates the effectiveness of the modified copolymer tie cement of the present invention in bonding Butyl rubber cover stock to steel in the presence of various carbon black fillers in the face stock:

TABLE II

*Adhesion of butyl rubber to steel with modified copolymer tie cement comparison of carbon blacks in face stock*

| Type of Black in Face Stock | Black Con. (Vol.) | Bond Strength (lbs./sq. in.) | Type of Failure |
|---|---|---|---|
| Medium Processing Channel | 30 (54 parts) | 653 | Between stock modified copolymer cement. |
| Semi-reinforcing | do | 656 | Do. |
| Fine thermal | do | 314 | Do. |
| High modulus furnace | do | 810 | Mostly between stock and copolymer layer with slight tearing of stock. |
| Medium Processing Channel | 60 (108 parts) | 550 | In copolymer layer. |
| Semi-reinforcing | do | 660 | Tears stock. |
| Fine thermal | do | 365 | Tears stock very badly. |
| High modulus furnace | do | 267 | Tears stock. |

(1) Base recipe for face stocks: Butyl rubber* 100, zinc oxide 5, sulfur 2, tetramethyl thiuram disulfide 1, carbon black as shown.
(2) Modified copolymer tie cement recipe: Modified copolymer** 100, zinc oxide 5, stearic acid 3, sulfur 1.5, modified channel black 75 (20% solids in solvent naphtha).
(3) Prime cement used was a chlorinated natural rubber base cement.

*97% isobutylene, 3% isoprene copolymer.
**40 parts styrene, 60 parts isobutylene, and 3 parts isoprene feed.

From the above table, it is seen that the highest values in pounds per square inch are given by the 54 parts high modulus black compound. Medium processing channel and semi-reinforcing furnace blacks give intermediate pull, while that of the fine thermal black is the lowest. The important consideration in the interpretation of these figures is not necessarily the total pounds developed at failure but rather the type of failure which occurs. For example, 108 parts of fine thermal black fails at a stress of only 365 lbs./sq. in. but the stock itself was the point of failure, not the bond. The results then are considered excellent.

When the modified copolymer tie cement is omitted from the constructions, the adhesion values drop drastically. A self cement of the 54 parts high modulus furnace compound was substituted in one experiment for the modified copolymer and the bond strength was only 300 lbs./sq. in. as compared to 810 lbs./sq. in. for the copolymer assembly.

The following table illustrates the effect of replacing a portion of the modified copolymer with a copolymer formed from 97% isobutylene and 3% isoprene:

TABLE III

| | |
|---|---|
| Modified copolymer [1] | 50 |
| Butyl rubber [2] | 50 |
| Zinc oxide | 5 |
| Sulfur | 1.5 |
| Stearic acid | 3 |
| Medium processing channel black | 75 |
| Solvent | Naphtha |
| Solids content | 20% |

[1] Prepared from a feed comprising 40 parts of styrene, 60 parts of isobutylene, and 3 parts of isoprene.
[2] Prepared from 97% isobutylene and 3% isoprene.

An assembly made up of the natural rubber primer cement, the above tie cement, and a face stock of Butyl rubber containing 54 parts of high modulus furnace black, gave an average pull of 835 pounds per square inch. Failure occurred mainly in the Butyl vulcanizate.

From the above data it is evident that a tie cement prepared from a mixture of the modified copolymer and Butyl rubber is equally as good if not better than the cement made up entirely of the modified copolymer. However, at elevated temperatures the blended cement is superior, as shown in Table IV:

TABLE IV

| Type Construction | Temp. of Test. °C. | Bond Strength, lbs./sq. in. | Percent Decrease | Type of Failure |
|---|---|---|---|---|
| Natural rubber-modified polymer [1] cement | 25 | 765 | | Pulls from modified polymer cement. |
| Do | 70 | 540 | 29.4 | Do. |
| Do | 100 | 390 | 49.4 | Do. |
| Natural rubber—50-50 Blend of Butyl rubber [2] and modified polymer [1] cement. | 25 | 776 | | Tears stock moderately. |
| Do | 70 | 650 | 16.2 | Do. |
| Do | 100 | 470 | 39.4 | Partial tear in stock and partial pulling from cement. |

[1] Prepared from a feed of 40 parts styrene, 60 parts isobutylene, and 3 parts isoprene.
[2] Prepared from 97% isobutylene and 3% isoprene.

As pointed out above, the only effective modified copolymer cement for use in adhering Butyl rubber to metals is one prepared from a copolymer made from a feed stock comprising 40 parts styrene, 60 parts isobutylene, and 3 parts of isoprene. The following table illustrates the criticalness of these proportions:

TABLE V

| Polymer | | | | | | | | | Butyl Rubber | | Face Stock | Adhesion, lbs./sq. in. |
|---|---|---|---|---|---|---|---|---|---|---|---|---|
| A | B | C | D | E | F | G | H | I | A | B | | |
| 100 | --- | --- | --- | --- | --- | --- | --- | --- | --- | --- | A | 810 |
| 75 | --- | --- | --- | --- | --- | --- | --- | --- | 25 | --- | A | 735 |
| 50 | --- | --- | --- | --- | --- | --- | --- | --- | 50 | --- | A | 834 |
| 25 | --- | --- | --- | --- | --- | --- | --- | --- | 75 | --- | A | 550 |
| --- | 100 | --- | --- | --- | --- | --- | --- | --- | --- | --- | A | 240 |
| --- | 50 | --- | --- | --- | --- | --- | --- | --- | 50 | --- | A | 453 |
| --- | 25 | --- | --- | --- | --- | --- | --- | --- | 75 | --- | A | 310 |
| --- | 50 | --- | --- | --- | --- | --- | --- | --- | --- | 50 | A | 354 |
| --- | 25 | --- | --- | --- | --- | --- | --- | --- | --- | 75 | A | 237 |
| --- | --- | 100 | --- | --- | --- | --- | --- | --- | --- | --- | A | 377 |
| --- | --- | 75 | --- | --- | --- | --- | --- | --- | 25 | --- | A | 420 |
| --- | --- | 50 | --- | --- | --- | --- | --- | --- | 50 | --- | A | 470 |
| --- | --- | --- | 100 | --- | --- | --- | --- | --- | --- | --- | B | 490 |
| --- | --- | --- | --- | 100 | --- | --- | --- | --- | --- | --- | B | 400 |
| --- | --- | --- | --- | --- | 100 | --- | --- | --- | --- | --- | B | 520 |
| --- | --- | --- | --- | --- | --- | 100 | --- | --- | --- | --- | B | 590 |
| --- | --- | --- | --- | --- | --- | --- | 100 | --- | --- | --- | B | 310 |
| --- | --- | --- | --- | --- | --- | --- | --- | 100 | --- | --- | B | 225 |

*Polymer A.*—Prepared from a feed consisting of 40 parts styrene, 60 parts isobutylene, and 3 parts isoprene.
*Polymer B.*—Prepared from a feed consisting of 50 parts styrene, and 50 parts isobutylene.
*Polymer C.*—Prepared from a feed consisting of 50 parts styrene, 50 parts isobutylene, and 3 parts isoprene.
*Polymer D.*—Prepared from a feed consisting of 40 parts styrene, 60 parts isobutylene, and 0.5 part isoprene.
*Polymer E.*—Prepared from a feed consisting of 41 parts styrene, 59 parts isobutylene, 1.0 part isoprene.
*Polymer F.*—Prepared from a feed consisting of 41 parts styrene, 59 parts isobutylene, and 1.5 parts isoprene.
*Polymer G.*—Prepared from a feed consisting of 33 parts styrene, 67 parts isobutylene, and 3 parts isoprene.
*Polymer H.*—Prepared from a feed consisting of 49 parts styrene, 51 parts isobutylene, and 3 parts isoprene.
*Polymer I.*—Prepared from a feed consisting of 51 parts styrene, 49 parts isobutylene, and 3 parts isoprene (low molecular weight polymer).
*Butyl Rubber A.*—Prepared from feed consisting of 97% isobutylene and 3% isoprene.
*Butyl Rubber B.*—Prepared from feed consisting of 96% isobutylene and 4% isoprene.
(1) Adhesive and Butyl were blended on a mill and dissolved in mutual solvent.
(2) Prime cement was modified natural rubber cement.
(3) *Face stock A.*—Butyl rubber A 100 parts, zinc oxide 5, stearic acid 3, sulfur 1.5, tetramethyl thiuram disulfide 1, high modulus furnace black 54.
*Face stock B.*—Butyl rubber A 100 parts, zinc oxide 5, sulfur 2, tetra-methyl thiuram disulfide 1, high modulus furnace black 54.
(4) *Curing conditions.*—45′ @ 307° F.
(5) *Tie cement recipe.*—Butyl rubber and copolymer parts as shown, zinc oxide 5, stearic 3, sulfur 1.5, medium processing channel black 75—(20% solids in naphtha).

From the above results it is clearly evident that the modified polymer containing 40% styrene is greatly superior to polymer prepared from other feed proportions.

The foregoing description does not by any means cover the possible uses of the invention nor the forms which it may assume, but serves to illustrate its fundamental principles. It is obvious that changes in the details may be made without departing from either its novel characteristics or the spirit and scope of the invention as defined in the appended claims.

For example, the novel cement of the present invention is useful in adhernig low unsaturation polymers to aluminum, black iron, brass, brass plate, bronze, cast iron, copper, lead, monel metal, nickel, nickel plate, stainless steel, terne plate, tin plate and tin-copper alloy. Likewise, other relatively non-polar rubber-like materials can be adhered to metals besides the low-unsaturation polymer described above. For example, the novel adhesive of this invention is suitable for adhering natural rubber, Buna-S (a copolymer of butadiene and styrene) and neoprene to any of the above metals.

The nature and objects of the present invention having thus been set forth and specific examples of the same given, what is claimed as new and useful and desired to be secured by Letters Patent is:

1. A structure comprising a metallic body, a copolymer of a major proportion of an isoolefin and a minor proportion of a diolefin attached thereto, and an adhesive film therebetween comprising a layer next to the metal of a modified rubber, chosen from the class consisting of chlorinated rubber, cyclized rubber and rubber hydrochloride, and a layer next to the copolymer of a copolymer, prepared by the low temperature polymerization of a feed comprising 60 parts by volume of isobutylene, 40 parts by volume of styrene, and 3 parts by volume of isoprene.

2. A structure comprising a metallic body, a copolymer of a major proportion of isobutylene and a minor proportion of isoprene attached thereto, and an adhesive film therebetween, comprising a layer next to the metal of a modified rubber, chosen from the class consisting of chlorinated rubber, cyclized rubber and rubber hydrochloride, and a layer next to the copolymer of a copolymer, prepared by the low temperature polymerization of a feed comprising 60 parts by volume of isobutylene, 40 parts by volume of styrene and 3 parts by volume of isoprene.

3. A structure comprising a metal member, an adherent layer adjacent the metal member of a modified rubber, chosen from the class consisting of chlorinated rubber, cyclized rubber and rubber hydrochloride, a layer adjacent the modified rubber layer of a copolymer prepared by the low temperature polymerization of a feed, comprising 60 parts by volume of isobutylene, 40 parts by volume of styrene, and 3 parts by volume of isoprene, and a final layer of a copolymer of 97% by volume isobutylene and 3% by volume of isoprene adherent thereto.

4. A structure comprising a metal member, an adherent layer adjacent the metal member of a modified rubber, chosen from the class consisting of chlorinated rubber, cyclized rubber and rubber hydrochloride, a layer adjacent the modified rubber layer of a mixture of equal parts by volume of a copolymer prepared by the low temperature polymerization of a feed, comprising 60 parts by volume of isobutylene, 40 parts by volume of styrene and 3 parts by volume of isoprene and a copolymer of 97% by volume of isobutylene and 3% by volume isoprene, and a final layer of a copolymer of 97% by volume isobutylene and 3% by volume of isoprene adherent thereto.

ADDISON W. HUBBARD.
WINTHROPE C. SMITH.

REFERENCES CITED

The following references are of record in the file of this patent:

UNITED STATES PATENTS

| Number | Name | Date |
|---|---|---|
| 2,469,710 | Baldwin | May 10, 1949 |

FOREIGN PATENTS

| Number | Country | Date |
|---|---|---|
| 599,437 | Great Britain | Mar. 12, 1948 |